Patented Oct. 20, 1953

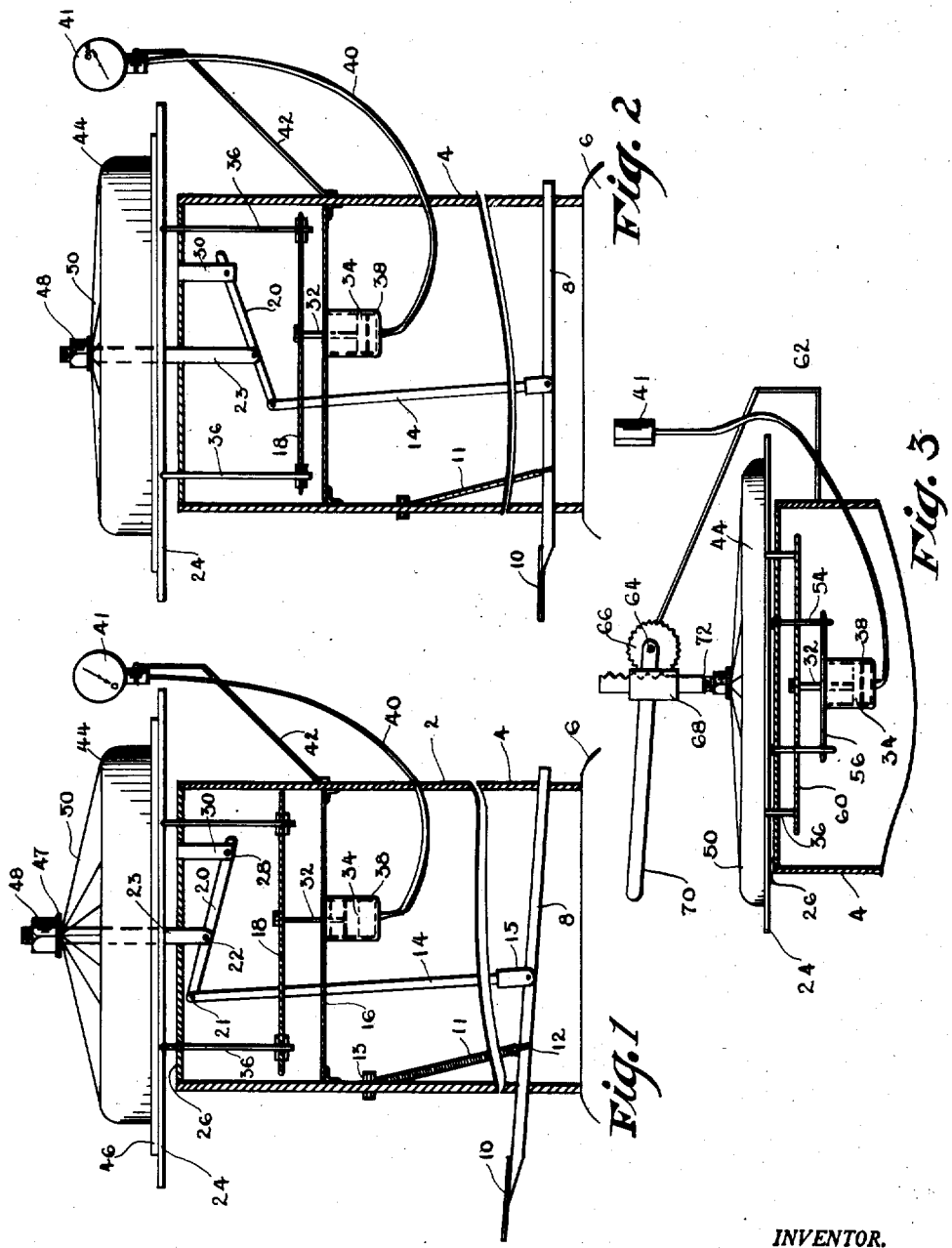

2,655,809

UNITED STATES PATENT OFFICE 2,655,809

TESTING APPARATUS FOR CLUTCH PLATES

Robert L. Edens, Tulsa, Okla.

Application November 5, 1948, Serial No. 58,449

2 Claims. (Cl. 73—161)

This invention relates to a testing apparatus and more particularly, but not by way of limitation, for a testing apparatus to indicate the spring tension in automotive clutch plates or the like.

In the manufacture or repair of clutch plates, particularly clutch plates for use in automobiles, either passenger or trucks, it is difficult for the mechanic to ascertain prior to installation of the clutch whether or not sufficient tension is provided to prevent the clutch from slipping. This tension is usually exerted through a spring or diaphragm provided in the clutch, and it is desirable to ascertain if the springs or diaphragm have sufficient pressure or tension in pounds per square inch.

It is well known that there are various types of spring testing apparatus. However, this invention is generally concerned with a testing apparatus for testing simultaneously all the springs, or a spring diaphragm plate utilized in a clutch, of either the finger arm spring type or the diaphragm plate type. The present apparatus cooperates with a calibrated recording gage to indicate in pounds per square inch the pressure in the clutch springs to ascertain whether sufficient tension is present to prevent slippage.

It is an important object of this invention to provide a testing apparatus for automotive clutch plates adapted to test the spring tension of the plate in order to indicate that sufficient pressure is present to prevent slippage of the plate.

A further object of this invention is to provide a testing apparatus capable of accurately indicating the tension in an automotive clutch plate having a plurality of actuating springs therefor.

And still another object of this invention is to provide a calibrated tension apparatus for indicating the tension in a spring diaphragm plate of an automotive clutch for accurately indicating the proper pressure of the diaphragm plate.

And still another object of my invention is to provide a testing apparatus which is simple in design, easy to manufacture, and capable of accurate indication.

In the drawings:

Fig. 1 is a sectional elevational view with certain parts in elevation showing the testing apparatus in non-operating position.

Fig. 2 is a similar view showing the apparatus in operating position.

Fig. 3 is a fragmentary sectional view of a modified form of the apparatus.

Referring to the drawings in detail, the testing apparatus generally indicated by reference character 2 comprises a cylindrical housing 4 mounted or supported on a base or platform 6 in any suitable manner. A lever 8 is pivotably secured at one side of the housing 4 in any suitable manner, and extends transversely across the housing 4 in and through a longitudinal slot (not shown) to extend outside the housing 4. A pedal plate member 10 is provided on the outward extension. A helical spring 11 is anchored to the lever 8 at 12, and its opposite end to the housing 4 at 13 for a purpose as will be hereinafter described. An upstanding rod 14 is pivotably connected through a swivel link 15 to the pedal arm 8. The rod 14 extends upwardly through an aperture (not shown) in a stationary plate member 16 disposed in the housing 4 at a point above the horizontal center line thereof. Furthermore the rod 14 extends through an aperture (not shown) in a floating plate 18, as will be hereinafter set forth. The upper end of the rod 14 pivotably connects with a link 20 at 21, which in turn is pivotably anchored at 22 to a projecting link 23 extending downwardly from a floating top plate 24 disposed above the cover plate 26 of the housing 4. The opposite end of the link is pivotably connected at 28 to a projecting arm 30 extending downwardly from the cover plate 26. It will be apparent that the pivotable link 20, rod 14 and foot pedal 10 are actuated to cause vertical movement of the link 23 in a manner as will be hereinafter set forth.

The floating plate 18 is provided with a downwardly extending piston rod 32 having a piston member 34 secured to the lower end thereof. The plate 18 is provided with circumferentially spaced pin members 36, preferably four in number but not limited thereto, which extend upwardly from the plate 18 through slots or apertures in the cover plate 26 into contact with the bottom face of the floating support plate 24 as is clearly shown in Figs. 1 and 2. A cylinder 38 is secured to the lower face of the plate 16 and extends downwardly therefrom. The piston 34 is disposed in the cylinder 38, and the piston rod 32 extends upwardly through the cylinder, and an aperture (not shown) in the plate 16 into connection with the floating plate 18. The cylinder is provided with any suitable fluid for a purpose as will be hereinafter set forth. Furthermore a conduit 40 communicates with the one end of the cylinder and preferably extends outwardly from the casing 4 into communication with a pressure recording gage 41 secured to the housing 4 by a bracket 42, in any suitable manner.

Operation

In operation, an automotive clutch apparatus 44 having an outward extending flange plate 46 is supported on the moveable plate 24. It will be apparent from Figs. 1 and 2 that the link 23 also extends vertically upward from the plate 24 and through a centrally disposed aperture (not shown) of the clutch 44. The clutch 44 is maintained on the link by a bearing washer 47 and a nut 48 threaded to the outer end of the fixed link 23. The clutch 44 as shown in Figs. 1 and 2 is of the corrugated diaphragm type where the diaphragm is indicated at 50, however, it will be understood that the invention is not limited to the diaphragm type of clutch, but may be utilized with a clutch having actuating finger arms cooperating with helical springs disposed within the body of the clutch or the like.

Referring to Fig. 1, the clutch 44 is secured to the plate 24 by the nut 48 and depression of the pedal 10 downwardly against the action of the spring 11 will cause a simultaneous downward movement of the arm 14 to provide a counter-clockwise movement of the link 20, about its pivot 28 thereby moving the link 23 downward. Movement of the link 23 downward compresses the diaphragm 50 to a position shown in Fig. 2.

It will be apparent that the link 23 is fixed to the moveable plate 24, and downward movement of the link will cause a downward movement of the plate 24 with a simultaneous downward movement of the pins 36 and moveable plate 18, piston rod 32 and piston 34 in cylinder 38, thereby causing a fluid displacement within the cylinder, which fluid may be either hydraulic or pneumatic. The pressure change is exerted through the conduit 40 on the pressure gage 41. The size of the piston 34 and hydraulic cylinder 38 may be calibrated relative to the gage 41 in order to indicate the necessary pressure or tension in the diaphragm plate 50. This indication preferably in pounds per square inch on the gage 41 is such to show that the diaphragm plate 50 has the proper tension to prevent slippage of the clutch during an actuation thereof in an automotive unit or the like.

Furthermore movement of the diaphragm 50 into a compressed state will release the clutch plate (not shown) whereby the testing apparatus in addition to showing a tension indication is utilized to show by observation that the clutch plate is in release position.

A release of the pedal 10 will cause the arm 8 to move upward assisted by the spring 11 to cause a reverse movement of the arm 14, link 20, thereby moving the link 23, plates 24, and 18 in a vertical upward movement. Movement of the link 23 upwardly will move the diaphragm plate 50 from the compressed condition. Furthermore, upward movement of the moveable plate 18 moves the piston 34 upwardly in the cylinder 38 to change the pressure condition relative to the gage 41.

In Fig. 3 is shown a modified form of the testing apparatus, particularly providing a portable apparatus. The shorter housing 4 has the usual cover plate 26 provided with downwardly extending studs 54 to which is secured a plate 56. The cylinder 38 having the piston 34 disposed therein is secured to the bottom face of the plate 56. The piston rod 32 extends through an aperture (not shown) in the plate 56 and upward into connection with the moveable plate 60, in turn supported by a plurality of circumferentially spaced pins 36 extending through the apertured cover 26, and attached to the lower face of the moveable plate 24 as in the preferred embodiment. A bracket member 62 is carried by the housing and is provided at its outer end with a shaft 64 carrying a pinion gear 66 cooperating with a rack 68 disposed in a collar 69 carried by a lever 70 fixed to the shaft 64 for causing rotation of the gear 66, which in turn provides vertical movement of the rack gear 68. It will be apparent that movement of the lever 70 downward will cause the rack 68 to move downwardly into contact with a stud 72 on plate 24, for securing the clutch 44 and diaphragm 50 thereto. Contact by the rack 68 will cause a simultaneous downward movement of the stud 72 to depress the diaphragm 50 whereby the moveable plate 24 and its cooperating moveable plate 60 will move the piston rod 32 downwardly in cylinder 38 to cause a change in the pressure condition in the cylinder 38 which will be recorded on the pressure gage 41 as in the preferred embodiment. Movement of the lever in a clockwise direction according to Fig. 3 will release the diaphragm 50 with a consequent relief of the increased pressure condition in the cylinder 38. The areas of the piston 34 and cylinder 38 are calibrated relative to the fluid acting on the gage 41 so that compression of the diaphragm 50 will indicate on the gage 41 the amount of tension therein in pounds per square inch. The modified form in Fig. 3 eliminates the linkage mechanism and the extension of the link 23 beneath the cover plate 26 as in the preferred embodiment; otherwise the operation of the apparatus is substantially the same for determining the tension of a clutch plate.

From the foregoing it will be apparent that the present invention contemplates a testing apparatus for automotive clutch plates which will indicate the amount of spring tension in the diaphragm or the springs of the clutch plate so that it may be easily predetermined whether the diaphragm or the springs have sufficient tension to prevent slipping of the clutch during an actual operation thereof. Furthermore the invention is capable of testing simultaneously a plurality of springs of a clutch to predetermine the tension therein. This avoids individual testing of the springs by the conventional type spring tester. Furthermore the operation of testing the tension will cause an actuation of the clutch plate whereby the operator can readily observe whether or not the plate is releasing properly.

Changes may be made in the specification and drawings without departing from the spirit of the invention within the scope of the following claims, as set forth.

I claim:

1. An apparatus for testing tension in a spring actuating member of a clutch, and comprising a housing, a moveable load reaction plate disposed above the housing for supporting the clutch, a second moveable plate disposed in the housing and rigidly connected to the first mentioned moveable plate, a hydraulic cylinder fixed within the housing, a piston carried by the second mentioned moveable plate and cooperating with the cylinder, a pressure gage, a conduit providing communication between the cylinder and the gage, link means for drawing the clutch against the first mentioned load reaction plate, and means connected with said link means for causing a compression of the spring actuating member of the clutch.

2. In a portable apparatus for testing a spring actuating member of a clutch plate and comprising a housing, a moveable plate for supporting the clutch plate, a cylinder fixed within the housing, a piston carried by the moveable plate and cooperating with the cylinder, a link extending through the top of said housing, the moveable plate and the clutch means in said housing connected to said link for moving said link and applying a force thereto, means connecting the link to the spring actuating member for exerting a force against the spring actuating member upon movement of the link to cause a compression of the spring actuating member with a simultaneous movement of the moveable plate, and a pressure gage communicating with the cylinder and responsive to a change of pressure in the cylinder for indicating the tension in the spring actuating member.

ROBERT L. EDENS.

References Cited in the file of this patent

UNITED STATES PATENTS

| Number    | Name         | Date           |
|-----------|--------------|----------------|
| 1,533,281 | Tautz        | Apr. 14, 1925  |
| 1,692,378 | Keena et al. | Nov. 20, 1928  |
| 1,822,587 | Essen        | Sept. 8, 1931  |
| 2,125,483 | Blanchard    | Aug. 2, 1938   |
| 2,341,216 | Hem          | Feb. 8, 1944   |